United States Patent
Ross

[11] Patent Number: 6,016,245
[45] Date of Patent: Jan. 18, 2000

[54] VOLTAGE OVERSHOOT PROTECTION CIRCUIT

[75] Inventor: Steven L. Ross, Lacey, Wash.

[73] Assignee: Intel Corporation, Santa Clara, Calif.

[21] Appl. No.: 09/041,983

[22] Filed: Mar. 13, 1998

[51] Int. Cl.[7] ...................................................... H02H 3/14
[52] U.S. Cl. .............................. 361/86; 361/79; 361/98; 361/111; 323/276; 323/280
[58] Field of Search .................... 361/18, 79, 56, 361/86, 91, 87, 111, 93–94, 98–100, 101; 323/274–276, 280–281, 284–286

[56] References Cited

U.S. PATENT DOCUMENTS

| | | | |
|---|---|---|---|
| 3,876,914 | 4/1975 | Lukas | 361/196 |
| 3,982,173 | 9/1976 | Berry et al. | 323/236 |
| 4,319,179 | 3/1982 | Jett, Jr. | 323/281 |
| 4,424,457 | 1/1984 | Leuthold | 327/777 |
| 4,513,341 | 4/1985 | Kollanyi | 361/91 |
| 4,536,699 | 8/1985 | Baker | 323/276 |
| 4,858,053 | 8/1989 | Profio | 361/23 |
| 5,105,324 | 4/1992 | Murari et al. | 361/18 |
| 5,189,587 | 2/1993 | Haun et al. | 361/56 |
| 5,337,205 | 8/1994 | Haun et al. | 361/56 |
| 5,568,345 | 10/1996 | Mudd et al. | 361/56 |

OTHER PUBLICATIONS

"Unitrode: Programmable Voltage Clamp," *Product Data Handbook*, 1997, Unitrode, Merrimack, NH, pp. 3–475 thru 3–478.

*Primary Examiner*—Jeffrey Gaffin
*Assistant Examiner*—Michael J. Sherry
*Attorney, Agent, or Firm*—Howard A. Skaist

[57] ABSTRACT

A voltage overshoot protection circuit includes an integration circuit configuration. The integration circuit configuration is included in the voltage overshoot protection circuit so as to integrate excess diverted current drawn from a bus. The voltage overshoot protection circuit is adapted to be electrically coupled to the bus.

16 Claims, 2 Drawing Sheets

VOLTAGE OVERSHOOT PROTECTION CIRCUIT

BACKGROUND

1. Field

The present invention is related to a voltage overshoot protection circuit.

2. Background Information

Electronic systems, such as large computer systems, that employ large amounts of memory typically contain expensive memory circuitry. For example, a server system may contain a gigabyte of memory that may cost in the neighborhood of $80,000 today. However, a large decrease in load current may result in an overshoot of the operating voltage of the memory circuitry beyond desired bounds or limits, typically before the source power supply is able to compensate for the large current change. For example, typically it is difficult for the power supply to compensate for changes in load faster than a few hundred microseconds. The operating voltage, for example, may rise between ten and twenty percent above the desired level in some instances. Such large changes in the operating voltage, induced by a change in load, may impair or destroy the memory chips. Therefore, it is desirable that voltage overshoot protection be employed to reduce the risk that the memory chips are destroyed. Of course, this is just one example in which voltage overshoot protection may be employed. Many other situations may also employ and/or benefit from voltage protection.

Several types of semiconductor devices and circuits have been used to suppress and/or limit transient voltages that may affect electronic circuitry. These devices typically perform a type of "shunt", or parallel regulation or limiting of the applied voltage. The zener diode is one commonly known device type, while the shunt regulator is a common circuit type, employed in this context. However, these devices or circuits may suffer from numerous shortcomings such as: fixed and non-precise voltage level detection, temperature induced inaccuracy and drift, fragility or easy self-destruction, and unwanted circuit loading, to name a few. A need therefore exists for a circuit or technique to address the foregoing problems.

SUMMARY

Briefly, in accordance with one embodiment of the invention, a voltage overshoot protection circuit includes an integration circuit configuration. The integration circuit configuration is included in the voltage overshoot protection circuit so as to integrate excess diverted current drawn from a bus. The voltage overshoot protection circuit is adapted to be electrically coupled to the bus.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1:
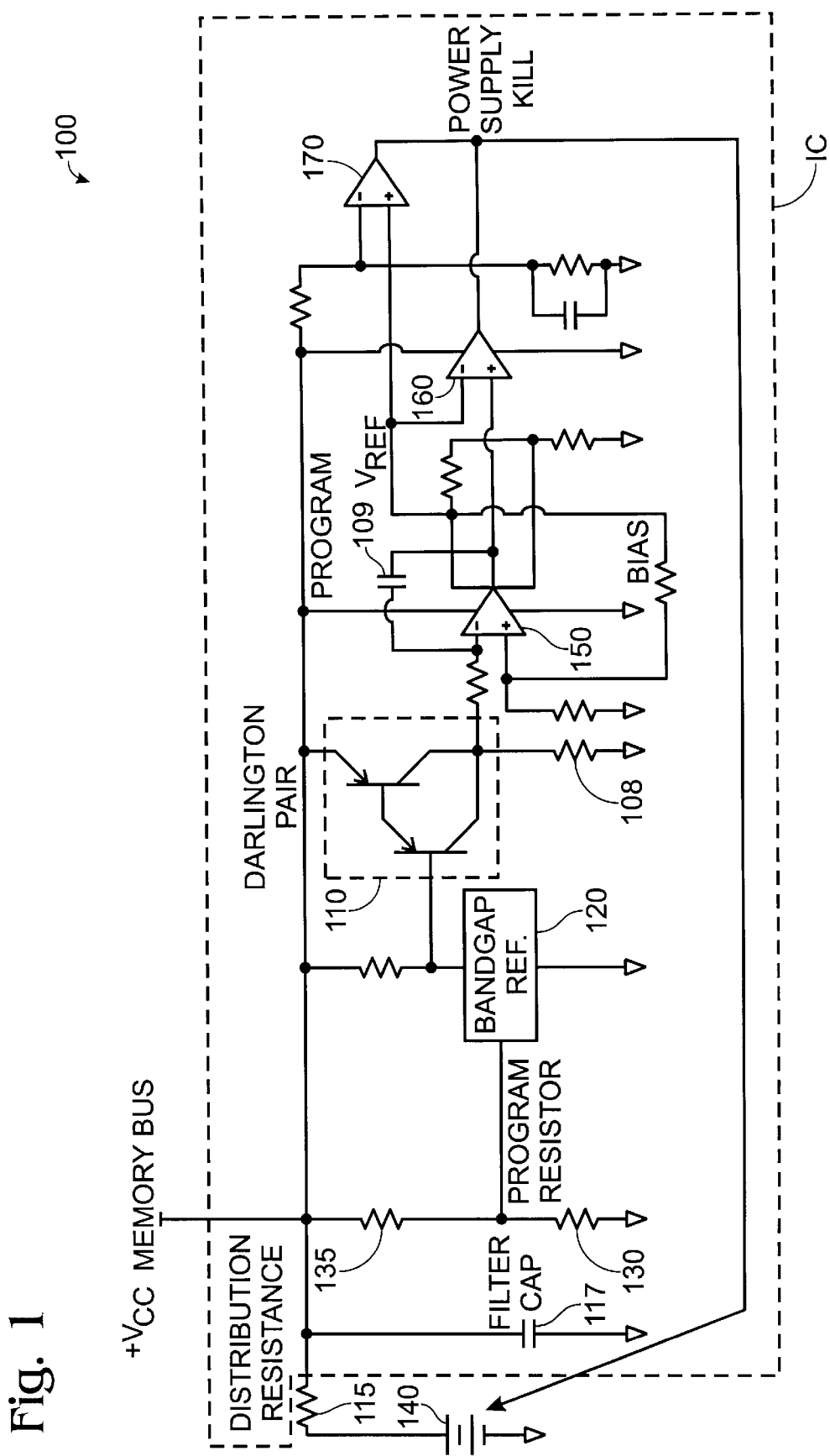
FIG. 1 is a circuit diagram illustrating an embodiment of a voltage overshoot protection circuit in accordance with the present invention.

FIG. 1 is a circuit diagram illustrating an embodiment 100 of an overshoot protection circuit in accordance with the invention. The circuit of FIG. 1 is illustrated as embodied on an integrated circuit (IC) chip, although the invention is not limited in scope in this respect. As illustrated, embodiment 100 includes a 3.3 volt power supply 140, although the invention is not limited in scope to a power supply of this particular voltage and, furthermore, typically embodiments will be manufactured and sold without the power supply. FIG. 1 also illustrates distribution resistance 115 to depict the resistance associated with transmitting power supply current over a bus that may be coupled to the circuit. Therefore, 115 represents an accumulation of small resistances associated with connectors, couplings, etc. between the power supply and the circuit. FIG. 1 also illustrates filter capacitor 117. Typically, embodiments in accordance with the invention will be adapted to be coupled to a bus, such as a memory bus.

As illustrated in this particular embodiment, a precision voltage reference, such as precision voltage reference 120, monitors the voltage of the memory bus to ensure that it is maintained closely within the proximity of 3.3 volts. A precision voltage reference is employed in this embodiment rather than a voltage regulator or zener diode, for example, in order to obtain greater precision. One example of a precision voltage reference includes a bandgap voltage reference, although alternatives may also be employed. Likewise, an adjacent program resistor 130, in conjunction with resistor 135, effectively sets the precision voltage reference to "turn on" when the voltage of the memory bus, in this embodiment, exceeds a pre-determined threshold voltage level such as, for example, 3.5 volts in this particular case. The invention is not limited in scope to this particular embodiment or to these particular voltage levels, yet one advantage of this particular embodiment employing program resistor 130 is that adjusting the resistance will effectively change the voltage level at which the precision voltage reference, such as 120, "turns on". Of course, other techniques to program the threshold voltage level at which the precision voltage reference will turn on may be employed. In addition, other approaches other than employing a precision voltage reference may be employed.

In this particular embodiment, turning on the precision voltage reference also "turns on" the darlington transistor pair 110 illustrated in FIG. 1. Once on, this darlington pair transistor configuration may "absorb", that is, the transistors may operate so that current flows in the transistor configuration, up to 10 amps of bus current in this embodiment. An advantage of having the darlington pair transistor configuration turn on and draw current, referred to in this context as "excess current", from the bus is that previously this excess current had been flowing through the memory chips. Therefore, in this embodiment, the temporary excess current is effectively diverted from the memory chips bus. As previously described, if this excess current were to be contained on the bus, the bus voltage would overshoot above the nominal which could seriously damage and/or destroy the chips. Likewise, in this embodiment, the precision voltage reference keeps the darlington pair transistor configuration turned on just enough to limit the memory bus voltage to the "tripping" voltage signal level of, in this particular embodiment, 3.5 volts. Thus, the voltage signal level of the memory bus is effectively limited by temporarily drawing the excess current through the darlington pair and, therefore, overshoot voltage protection is accomplished, A darlington pair configuration is employed due to the relatively high gain it provides. Nonetheless, it will, of course, be appreciated that an alternative transistor configuration other than a darlington pair transistor configuration may be employed in alternative embodiments in accordance with the invention.

Following the darlington pair transistor configuration in this embodiment is an operational amplifier 150 coupled in a configuration so that the voltage across a 0.1 ohm sense amp resistor 108 is integrated, referred to in this content as an "operational amplifier integration configuration". Of course, the invention is not restricted in scope to this particular configuration and any circuit configuration to integrate a voltage signal may be employed. Due to the circuit configuration, the amount of excess current directed through the darlington pair transistor configuration is effectively integrated. This integration operation accomplished by this configuration effectively results in the output voltage signal of the operational amplifier integrator configuration declining from a 3.3 voltage signal level output level in this embodiment, for example, as more diverted excess current is integrated. Therefore, if the integrated value of the excess current "shunted" by the darlington pair transistor configuration exceeds a substantially predetermined voltage threshold value or level, the output voltage signal level produced by the operational amplifier integration configuration ramps down and the output signal applied to comparator 160 will "trip" comparator 160 in this particular embodiment. Again, the voltage level at which this tripping or triggering occurs may be adjusted by adjusting the reference voltage, Vref in FIG. 1, for comparator 160. In this particular embodiment, tripping comparator 160 produces a logic low output voltage signal to be applied to the source power supply, which in this particular embodiment turns the power supply off, rather than acting to "crowbar" the source power supply. Therefore, the power supply is temporarily disabled instead of being permanently disabled. Likewise, the voltage level of the supply bus does "collapse." Of course, again, the invention is not limited in scope in this respect and a variety of signals or a variety of techniques may be employed to signal and disable the supply. Likewise, the invention is not limited in scope to a particular signal convention, such as "low" versus "high". An added advantage of including a low value sensing resistor in series with the darlington pair transistor configuration is that the resistor reduces the amount of power absorbed by that configuration.

In this embodiment, a comparator 170 is included that monitors the voltage signal level of the bus. At a voltage signal level exceeding the selected trip point level for the bus, such as in this particular embodiment 3.6 volts, an output voltage signal is produced that is low if this 3.6 threshold voltage is exceeded and, therefore, again, disables the source power supply. Therefore, comparator 170 provides additional protection beyond the protection afforded by comparator 160.

Embodiments in accordance with the present invention provide a number of advantages. For example, the embodiment in accordance with the present invention, such as the embodiment previously illustrated and described, is relatively fast, providing speeds on the order of a few microseconds. In contrast, the intrinsic capacitance of a zener diode, for example, tends to increase the response time too much to be of value in protecting the memory chips. Likewise, an embodiment in accordance with the present invention, such as the embodiment previously described, provides precise level protection at the voltage signal level protection point. As previously described, this is accomplished in this particular embodiment using a precision voltage reference, although the invention is not limited in scope in this respect. In addition, stable temperature operation is accomplished in comparison with alternative approaches. More specifically, the trip point is relatively constant over a wide range of temperatures. Likewise, depending upon the embodiment, a large current may be shunted, such as in one of the prior embodiments where up to 20 amps may be shunted to ground. Furthermore, an embodiment in accordance with the present invention may operate down to a relatively low voltage, such as in the previous embodiments, using a precision voltage reference, for example. This particular embodiment also provides virtual non-loading to the circuit being protected when the voltage overshoot protection circuit is not in operation because, for example, the darlington pair configuration in FIG. 1 is not active. Likewise, electromagnetic interference, such as may be attributable to transients, is reduced. Referring to FIG. 1, in this particular embodiment, additional operating biases are successfully omitted, although typically such biases are employed in voltage overprotection circuits. As previously described, the voltage trigger level may be programmed by adjusting the reference voltage for the comparators and, likewise, the amount of energy absorption or diversion may be programmed by adjusting value of the integrating capacitor or by adjusting the integration trigger point. In this particular embodiment a power supply disable signal is produced upon a fault detection, providing additional protection. Likewise, due to the particular components employed in this particular embodiment, this particular embodiment is well-suited for fabrication in an integrated circuit. Further, by providing access pins on such an integrated circuit, in an embodiment, for example, so that resistor 130 and program capacitor 109 in FIG. 1, for example, may be programmed, the user may thereby effectively program both the bus trip point and the energy absorbed.

Figure 2:
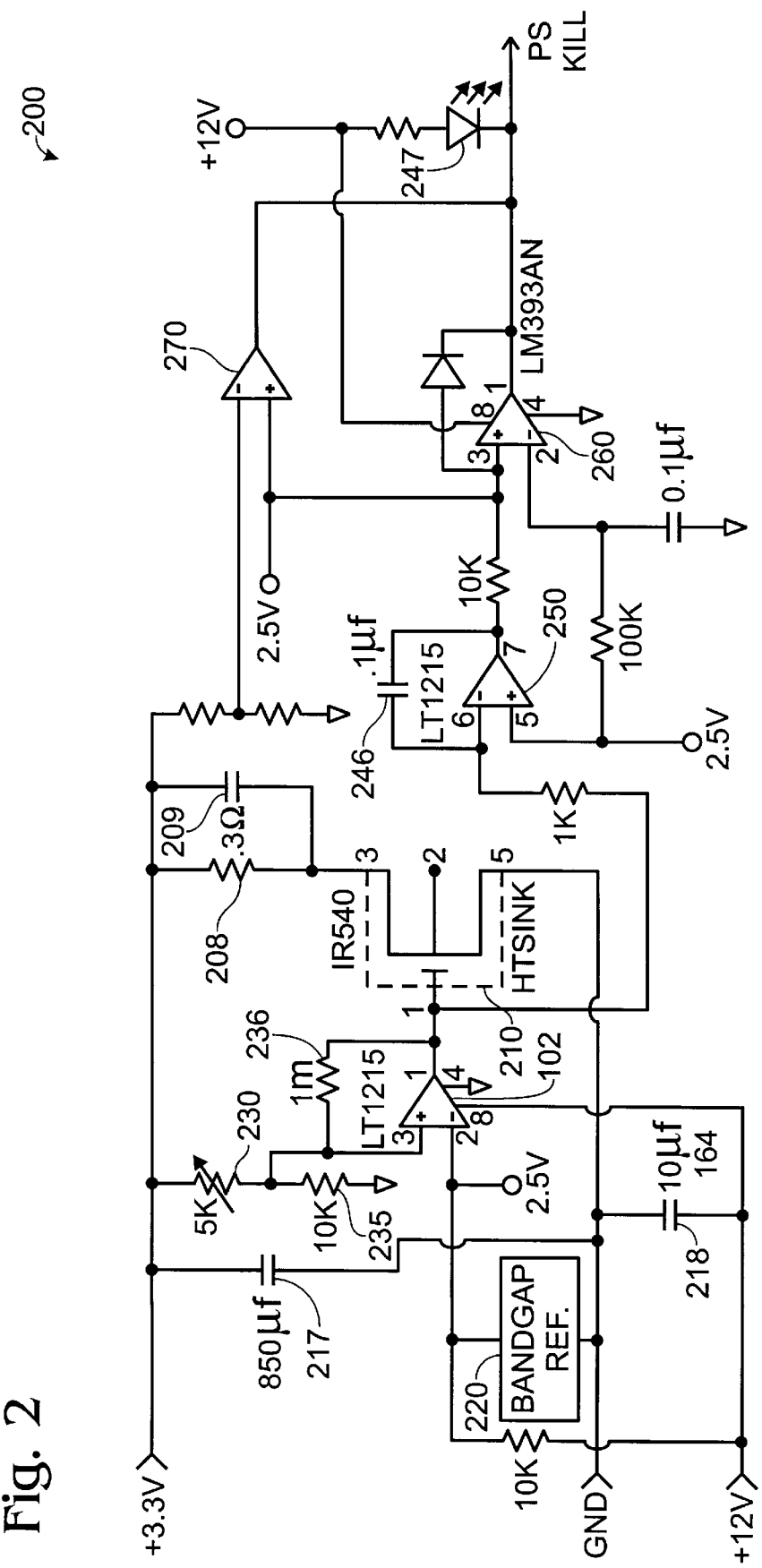
FIG. 2 is a circuit diagram illustrating another embodiment of a voltage oversheet protection circuit in accordance with the present invention.

FIG. 2 is a circuit diagram illustrating another embodiment of a voltage overprotection circuit in accordance with the present invention. The operation of this particular circuit is similar to the operation of the embodiment previously described and illustrated in FIG. 1. The embodiment of FIG. 1 may be employed and provide satisfactory operation in order to divert excess currents of up to 10 amps. However, for overprotection situations in which it is desirable to divert more than 10 amps, the embodiment illustrated in FIG. 2 may prove more desirable. A disadvantage of the embodiment of FIG. 1 relates to the emitter collector saturation voltage of darlington pair configuration 110. If the darlington pair configuration absorbs enough current the voltage drop across the darlington pair configuration, in conjunction with a relatively low voltage power source, such as 3.3 volts in this particular embodiment, may result in a sufficiently small voltage drop across transistor 108 so that operational amplifier 150 in this particular embodiment may not provide reliable performance. More specifically, the darlington pair transistor configuration collector-to-emitter saturation voltage may rise above 3 volts if more than 10 amps are conducted. Many embodiments and circuit configurations may be employed to accommodate currents greater than 10 amps, and the embodiment illustrated in FIG. 2 is one example of such a circuit configuration. In this embodiment, as described with respect to the embodiment of FIG. 1, a precision voltage reference, 220 in FIG. 2, is employed. As illustrated, the voltage level of the precision voltage reference is compared with the voltage level produced by the voltage divider circuit configuration of resistors 230 and 235. As illustrated in this particular embodiment, resistor 230 comprises a variable resistor to effectively program the trip or trigger point for the voltage overshoot protection circuit so that excess current may be diverted through metal-oxide semiconductor (MOS) field effect transistor (FET) 210 in FIG. 2. Of course, the invention is not limited in scope to a MOSFET. A variety of power semiconductor devices may be employed in a configuration in this manner. When the voltage provided via a bus, as previously described, illustrated in FIG. 2 as 3.3 volts, is sufficiently low, the output signal of comparator 102 is a "low" digital voltage signal in this particular embodiment. However, when the voltage signal provided by the bus achieves a sufficiently high voltage level, divider circuit configuration 230 and 235 are selected and arranged so that a voltage signal will be applied to pin 3 in FIG. 2 to trigger or trip the comparator and, thereby, produce a high output voltage signal at pin 1 of op amp 102. In this particular embodiment, comparator 102 is illustrated as component LT1215, available from Linear Technology Corp., Malpitas, Calif., although, of course, the invention is not limited in scope in this respect. Likewise, filter capacitors, such as 217 and 218, and resistors, such as 236, are provided, although the invention is not limited in scope to the particular values illustrated or to the particular configuration illustrated.

For the embodiment illustrated in FIG. 2, when the output voltage signal of comparator 102 is applied to MOSFET 210 and that output signal transitions from low to high, this effectively creates a current path through MOSFET 210 from the bus, coupled to this voltage overprotection circuit, to ground. In this particular embodiment, although the invention is not limited in scope in this respect, MOSFET 210 comprises IR 540, available from International Rectifier, Segundo, Calif., although, again, other MOSFETs may be employed. Likewise, as illustrated in FIG. 2, a heat sink is physically attached to this particular MOSFET because, in this embodiment, when current is diverted through MOSFET 210 to ground, this may produce excess heat to be dissipated in order to reduce the risk that MOSFET 210 may incur damage. This embodiment of the protection circuit may include a resistor in series with the drain lead of the power MOSFET to reduce the amount of power dissipated in the MOSFET. A capacitor 209 in parallel with the resistor conducts high speed transients around the resistor, allowing a smaller voltage rating to be specified for the resistor.

Similar to the approach employed in FIG. 1, a voltage related to the diverted excess current via MOSFET 210 may be integrated so that when the voltage level applied to the voltage overprotection circuit by the bus reaches a level that may introduce an unacceptable risk of damage, for example, to memory chips exposed to the bus, as previously described, the source power supply is disabled or turned off. In this particular embodiment, as with the previously described embodiment, an operational amplifier integration configuration is employed. In this particular embodiment, operational amplifier 250 comprises a, LT 1215, although, again, the invention is not limited in scope in this respect. The integration is accomplished in this embodiment, by applying a voltage signal from MOSFET 210 to pin 6 of op amp 250. Before MOSFET is activated, the voltage across capacitor 246 should be approximately 10 volts in this particular embodiment. More particularly, a 2.5 volt signal is applied to pin 5 of op amp 250 and the voltage source for the op amp is 12 volts. Therefore, the output signal of the op amp should also be roughly 10 volts. Once MOSFET 210 is activated and a voltage signal is applied to pin 6 the operational amplifier integration configuration begins to integrate the voltage signal, which will have the effect of reducing the voltage output signal of the operational amplifier. Therefore, the output signal of operational amplifier 250 at pin 7 applied to comparator 260 should begin to ramp down from about 10 volts to approximately 2.5 volts. As illustrated in FIG. 2, in this particular embodiment, 2.5 volts is also applied to pin 2 of comparator 260 while the output voltage signal of operational amplifier 250 is applied to pin 3 of that comparator. In this particular embodiment, comparator 260 comprises an LM393AN, available from National Semiconductor Corp., Santa Clara, Calif., although, again, the invention is not limited in scope in this respect. Therefore, once the output voltage signal operational amplifier 250 is a sufficiently low voltage level, comparator 260 is tripped or triggered, which produces a signal to disable or turn off the source power supply. The capacitors and resistors in the operational amplifier configuration 250 may be chosen to ensure that the amount of time it takes for the output voltage signal of amplifier 250 to reach the appropriate voltage signal level to trigger a comparator 260 does not result in damage to the memory chips or circuits that are desired to be protected by the voltage overshoot protection circuit. Furthermore, as the previous discussion illustrates, this amount of time may be programmed based upon the parameter values of the components provided.

This particular embodiment also includes an additional layer of protection from comparator 270, although, of course, the invention is not limited in scope in this respect. If, for example, the previously described circuit malfunctions, it may take too long for the output voltage signal of operational amplifier 250 to reach the appropriate voltage level to trigger comparator 260. Damage may, therefore, result to the memory chips or circuits that are intended to be protected. Therefore, an additional circuit is provided, again, in this particular embodiment, in the form of a voltage divider, coupled to the bus providing the overshooting voltage signal. This voltage signal produced by the voltage divider is applied to comparator 270 and the voltage divider is arranged and parameter values are selected so that it operates inresponse to a "fail safe" voltage signal level in order to disable or turn off the source power supply if that voltage signal level is reached. Likewise, the voltage signal level provided by the voltage divider to comparator 270 is compared with the 2.5 volt voltage reference. previously described, although, of course, any voltage signal level may be employed. In this particular embodiment, the output signal ports for comparators 260 and 270 are coupled so that a logical OR operation between the two output signals is accomplished. Therefore, if either voltage output signal indicates that the source power supply should be disabled, then this operation may be implemented via further circuitry. This particular embodiment also includes a light emitting diode 247, although this is merely employed for wiring and troubleshooting this embodiment and may be omitted in alternative embodiments. The resistor and capacitor coupled to pin 2 of comparator 260 in this embodiment prevents the comparator from "glitching" to a low state during the transient start-up of the circuit.

One embodiment of a method of diverting excess current through a voltage overprotection circuit in accordance with the invention, includes the following. A diversion path for the excess current may be activated when the voltage level of the signal bus achieves a substantially predetermined level so that the voltage level of the supply bus is substantially maintained within substantially predetermined voltage level limits or bounds. For example, as previously described and illustrated, a MOSFET may provide such a current path. Likewise, an operation is performed upon reaching a substantially predetermined amount of diverted excess current. For example, as previously described, a power supply may ultimately be disabled; however, the invention is not restricted in scope in this respect and other operations may be performed in alternative embodiments. The voltage level of the signal bus may be compared with, for example, a precision voltage reference to determine whether the voltage level of the signal bus has achieved the substantially predetermined amount. Likewise, the diverted excess current flowing through the diversion path may be integrated to determine the amount of diverted excess current flowing though the diversion path. For example, as described and illustrated, an operational amplifier integration configuration may be employed to integrate a voltage related to the diverted excess current. The source power supply may be disabled when a signal indicates that the integrated diverted excess current has achieved the substantially predetermined amount.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

I claim:

1. A voltage overshoot protection circuit comprising:
   an integration circuit configuration, said integration circuit configuration being included in said circuit so as to integrate excess diverted current drawn from a bus;
   said protection circuit being adapted to be electrically coupled to the bus, the voltage overshoot protection circuit including circuitry to detect the voltage overshoot, the circuitry to detect the voltage overshoot including a bandgap voltage reference source;
   wherein the voltage overshoot protection circuit is capable of being programmed for both the bus voltage signal level trip point and the amount of energy to be absorbed;
   wherein the voltage overshoot protection circuit includes the capability to respond to a voltage overshoot within on the order of a few microseconds.

2. The voltage overshoot protection circuit of claim 1, wherein the voltage overshoot protection circuit is capable of being programmed for both the bus voltage signal level trip point and the amount of energy to be absorbed by changing only an external resistor or/and capacitor.

3. The voltage overshoot protection circuit of claim 2, wherein:
   the integration circuit configuration comprises an operational amplifier integration circuit configuration.

4. The voltage overshoot protection circuit of claim 3, and further comprising:
   a transistor configuration coupled in the voltage overshoot protection circuit so that the excess current diverted from the bus flows therethrough.

5. The voltage overshoot protection circuit of claim 4, wherein:
   the transistor configuration comprises a darlington pair transistor configuration.

6. The voltage overshoot protection circuit of claim 2, and further comprising a comparator circuit configuration coupled to receive an output signal of the integration circuit configuration and responsive thereto.

7. A voltage overshoot protection circuit comprising:
   a metal-oxide semiconductor field effect transistor (MOSFET) integration circuit configuration,
   said integration circuit configuration being included in said circuit so as to integrate a voltage related to excess diverted current drawn from a bus;
   said protection circuit being adapted to be electrically coupled to the bus;
   the voltage overshoot protection circuit including circuitry to detect the voltage overshoot, the circuitry to detect the voltage overshoot including a bandgap voltage reference source;
   wherein the voltage overshoot protection circuit is capable of being programmed for both the bus voltage signal level trip point and the amount of energy to be absorbed;
   wherein the voltage overshoot protection circuit includes the capability to respond to a voltage overshoot within on the order of a few microseconds.

8. A computing system comprising:
   a voltage overshoot protection circuit, said voltage overshoot protection circuit being adapted to be coupled to a bus;
   a transistor configuration coupled in said voltage overshoot protection circuit to receive excess current diverted from said bus;
   an integration circuit coupled to said transistor configuration to integrate the amount of excess current diverted from said bus through said transistor configuration; and
   said voltage overshoot protection circuit being adapted to disable a power source based, at least in part, on the integrated amount of excess diverted current from said bus,
   wherein the voltage overshoot protection circuit includes circuitry to detect the voltage overshoot, the voltage overshoot detection circuitry including a bandgap precision voltage reference source;
   wherein the voltage overshoot protection circuit is capable of being programmed for both the bus voltage signal level trip point and the amount of energy to be absorbed;
   wherein the voltage overshoot protection circuit includes the capability to respond to a voltage overshoot within on the order of a few microseconds.

9. The computing system of claim 8, wherein the voltage overshoot protection circuit is capable of being programmed for both the bus voltage signal level trip point and the amount of energy to be absorbed by changing only an external resistor or/and capacitor.

10. The computing system of claim 9, wherein:
    the integration circuit configuration comprises an operational amplifier integration circuit configuration.

11. The computing system of claim 10, wherein:
    the transistor configuration comprises a darlington pair transistor configuration.

12. A computing system comprising:

a voltage overshoot protection circuit, said voltage overshoot protection circuit being adapted to be coupled to a bus;

a metal-oxide semiconductor field effect transistor (MOSFET) integration circuit configuration;

said integration circuit configuration being coupled so as to integrate a voltage related to excess current diverted from said bus;

said voltage overshoot protection circuit being adapted to disable a power source based, at least in part, on the integrated voltage;

wherein the voltage overshoot protection circuit includes circuitry to detect the voltage overshoot, the voltage overshoot detection circuitry including a bandgap precision voltage reference source;

wherein the voltage overshoot protection circuit is capable of being programmed for both the bus voltage signal level trip point and the amount of energy to be absorbed;

wherein the voltage overshoot protection circuit includes the capability to respond to a voltage overshoot within on the order of a few microseconds.

13. A method of diverting excess current through a voltage overprotection circuit comprising:

activating a diversion path for the excess current when the voltage level of a supply bus achieves a substantially predetermined level so that the voltage of the supply bus is substantially maintained within substantially predetermined voltage level bounds;

comparing the voltage level of the supply bus with a bandgap precision voltage reference to determine whether the voltage level of the supply bus has achieved the substantially predetermined level; and performing an operation upon reaching a substantially predetermined amount of diverted excess current;

wherein the voltage overprotection circuit includes the capability to respond to a voltage overshoot within on the order of a few microseconds; and wherein the substantially predetermined voltage level and the substantially predetermined amount of diverted excess current were programmed.

14. The method of claim 13, wherein the substantially predetermined voltage level and the substantially predetermined amount of diverted excess current were programmed by changing only an external resistor or/and capacitor.

15. The method of claim 14, wherein:

performing an operation includes integrating the diverted excess current flowing through the diversion path to determine the amount of diverted excess current flowing through the diversion path.

16. The method of claim 15, wherein:

performing an operation includes disabling a source power supply when the integrated diverted excess current achieves the substantially predetermined amount.

* * * * *